(12) United States Patent
Joshi (10) Patent No.: US 7,417,788 B2
(45) Date of Patent: Aug. 26, 2008

(54) OPTICAL LOGIC DEVICE

(76) Inventor: Aditya Narendra Joshi, 30 Hillcrest Village West, Apt. C1, Niskayuna, NY (US) 12309

( * ) Notice: Subject to any disclaimer, the term of this patent is extended or adjusted under 35 U.S.C. 154(b) by 16 days.

(21) Appl. No.: 11/601,894

(22) Filed: Nov. 20, 2006

(65) Prior Publication Data

US 2007/0115524 A1    May 24, 2007

Related U.S. Application Data

(60) Provisional application No. 60/738,467, filed on Nov. 21, 2005.

(51) Int. Cl.
  G02F 1/29   (2006.01)
  G02B 5/22   (2006.01)
(52) U.S. Cl. .................. 359/320; 359/885
(58) Field of Classification Search ........ 359/320, 359/885
  See application file for complete search history.

(56) References Cited

U.S. PATENT DOCUMENTS

| | | | | |
|---|---|---|---|---|
| 3,389,269 A | * | 6/1968 | Giordmaine et al. | 359/328 |
| 3,745,476 A | * | 7/1973 | Mack | 359/333 |
| 3,849,740 A | * | 11/1974 | Brandt | 372/8 |
| 3,902,061 A | * | 8/1975 | Harris | 250/214 LS |
| 3,984,185 A | | 10/1976 | Riseberg et al. | |
| 4,382,660 A | * | 5/1983 | Pratt et al. | 359/244 |
| 4,701,030 A | * | 10/1987 | Jewell | 359/243 |
| 4,761,050 A | * | 8/1988 | Byron | 385/16 |
| 4,767,197 A | * | 8/1988 | Yeh | 359/244 |
| 4,992,654 A | * | 2/1991 | Crossland et al. | 250/214 LS |
| 5,080,466 A | * | 1/1992 | Boothroyd et al. | 359/577 |
| 5,097,357 A | * | 3/1992 | Ranganathan et al. | 359/243 |
| 5,119,227 A | * | 6/1992 | Dawson et al. | 359/244 |
| 5,132,983 A | | 7/1992 | Behfar-Rad | |
| 5,182,666 A | * | 1/1993 | Kawabe | 359/107 |
| 5,268,785 A | * | 12/1993 | Crenshaw et al. | 359/244 |
| 5,319,492 A | * | 6/1994 | Dorn et al. | 359/296 |
| 5,463,485 A | * | 10/1995 | Alfano et al. | 359/107 |
| 5,537,243 A | | 7/1996 | Fatehi et al. | |
| 5,737,102 A | | 4/1998 | Asher | |
| 5,757,525 A | * | 5/1998 | Rao et al. | 359/108 |
| 5,825,790 A | | 10/1998 | Lawandy | |
| 5,943,354 A | | 8/1999 | Lawandy | |
| 6,005,791 A | * | 12/1999 | Gudesen et al. | 365/114 |
| 6,091,536 A | * | 7/2000 | Usami et al. | 359/244 |

(Continued)

FOREIGN PATENT DOCUMENTS

JP    02097920  A2    4/1990

(Continued)

OTHER PUBLICATIONS

Lin et al. A polarizer-free flexible and reflective electro-optical switch using dye-doped liquid crystal gels. Optics Express 1777. vol. 16. No. 3. Feb. 4, 2008.*

*Primary Examiner*—Deandra M Hughes
(74) *Attorney, Agent, or Firm*—John B. Woodard (57) ABSTRACT

The invention uses optically active dyes or other optically active materials to perform digital data processing and logic functions on optical data. The data is carried in pulses of photons of wavelengths appropriate to interact with the optically active materials to excite or de-excite them. The use of the invention in performing various optical processing functions is described.

18 Claims, 7 Drawing Sheets

U.S. PATENT DOCUMENTS

| | | | |
|---|---|---|---|
| 6,128,110 A | 10/2000 | Bulow | |
| 6,246,496 B1* | 6/2001 | Fischer | 398/48 |
| 6,353,498 B1 | 3/2002 | Maeda | |
| 6,402,037 B1* | 6/2002 | Prasad et al. | 235/487 |
| 6,424,438 B1 | 7/2002 | Byun et al. | |
| 6,437,887 B1* | 8/2002 | Usami et al. | 359/108 |
| 6,462,865 B1 | 10/2002 | Chu et al. | |
| 6,624,929 B2 | 9/2003 | Kang et al. | |
| 6,766,072 B2 | 7/2004 | Marazzi et al. | |
| 6,778,724 B2* | 8/2004 | Wang et al. | 385/16 |
| 6,801,349 B2 | 10/2004 | Kim et al. | |
| 6,804,047 B2 | 10/2004 | Byun et al. | |
| 6,810,407 B1 | 10/2004 | Jaques et al. | |
| 6,853,658 B1 | 2/2005 | DiJaili et al. | |
| 6,930,826 B2 | 8/2005 | Kim et al. | |
| 6,963,677 B1 | 11/2005 | Spickermann et al. | |
| 6,985,652 B2* | 1/2006 | Tatsuura et al. | 385/16 |
| 6,990,281 B2* | 1/2006 | Shahar et al. | 385/122 |
| 7,010,187 B1* | 3/2006 | Fitz | 385/18 |
| 7,019,875 B2* | 3/2006 | Pittman et al. | 359/107 |
| 7,046,434 B1 | 5/2006 | DiJaili et al. | |
| 7,123,407 B2* | 10/2006 | Byun et al. | 359/344 |
| 7,198,737 B2* | 4/2007 | Natarajan et al. | 252/582 |
| 7,254,287 B2* | 8/2007 | Ellwood Jr. | 385/11 |
| 2002/0018277 A1* | 2/2002 | Carlson et al. | 359/244 |
| 2002/0044353 A1* | 4/2002 | Salzman | 359/488 |
| 2002/0114032 A1* | 8/2002 | Salzman | 359/122 |
| 2003/0072519 A1* | 4/2003 | Bolanos | 385/16 |
| 2004/0109633 A1* | 6/2004 | Pittman et al. | 385/16 |
| 2004/0175174 A1* | 9/2004 | Suhami | 398/43 |
| 2005/0163419 A1* | 7/2005 | Scherer | 385/16 |
| 2005/0259999 A1* | 11/2005 | Covey | 398/188 |
| 2007/0189665 A1* | 8/2007 | Covey | 385/27 |
| 2007/0189706 A1* | 8/2007 | Covey | 385/147 |

FOREIGN PATENT DOCUMENTS

| | | |
|---|---|---|
| JP | 02190830 A2 | 7/1990 |
| RU | 1995097109174 | 12/1995 |
| RU | 2140100 C1 | 10/1999 |

* cited by examiner

OPTICAL LOGIC DEVICE

CROSS REFERENCE TO RELATED APPLICATION

This application claims the benefit of U.S. Provisional Patent Application No. 60/738,467 filed Nov. 21, 2005.

BACKGROUND OF THE INVENTION

The invention relates to the use of active optical materials to perform logic operations using optical signals.

In the field of digital electronics, specific logic functions are performed by electronic circuits. These logic functions are commonly known by those skilled in the art of digital electronics. Examples of the logic functions and their electronic analogs are known as the AND gate, the NAND gate, the OR gate, the NOR gate and various other logic based circuits that can be designed to perform particular electronic functions. These functions are based on a truth table or logic table that defines the output when a set of selected input conditions are present. It is possible to design electronic circuits so that they replicate the results of these truth tables. In these designs substantial flexibility is available by manipulating the outputs of the gates with electronic changes such as the addition of a state inverter, which can be used with circuits to switch the nature of one gate to that of another gate or can otherwise be used to invert the digital state of a signal. Often these logic circuits are utilized in large numbers to make electronic computers.

The use of optically active materials, especially semiconductor lasers and optical fibers for data transmission, has led to increasing interest in optically driven circuits that can be driven directly by incoming photons carrying information. Eliminating the need to switch from an optical to an electrical signal improves the ability of networks to handle more data.

If entire computers could be built with optically driven circuits, they could also operate at higher speed. Because of this, it has been a goal in computer technology to build computers using optically based switching circuitry. It is thought that such optically based circuits will provide advantages in addition to improved computing speed and could find application in advanced computing techniques such as quantum computing.

In addition these optically based circuits would improve the performance and abilities in various other applications such as transmission networks and resistance to ElectroMagnetic Pulse (EMP), and other electromagnetic disturbances. However, there are a myriad of challenges before technologists to accomplish such advanced goals. In particular the creation of suitable optical logic circuits has challenged computer technologists giving rise to a need for improved optical switches that can operate individually or be made into logic gates or other information processing constructions.

BRIEF DESCRIPTION OF THE INVENTION

An apparatus performs digital data manipulation of optical data carried by photons. The apparatus comprises an optically active material capable of existing in an excited state and a de-excited state which is used for switching between the two states. A source of pumping energy is used for exciting the optically active material to an excited state. At least one optical data signal source capable of changing the state of the optically active material is used, and a sense signal source for providing a sense signal to the optically active material for determining the state of the optically active material is used to deliver the sense signal to a detector. The detector detects the state of the optically active material from the sense signal.

An apparatus for optical logic gate data processing is provided. The apparatus comprises an optically active material that can be optically switched between at least two states. By using a pumping energy source the optically active material is excited. At least one optical data signal source capable of changing the state of the optically active material is used to process the data. To determine the state of the optically active material a sense signal source is used to provide a sensing signal. A detector is used to detect the state of the optically active material from the sense signal.

A method for optically manipulating digital optical data carried by photons is provided. This is accomplished by providing a pumping mechanism to excite an optically active material and by providing at least one digital optical signal at a frequency suitable to interact with an optically active material. The digital optical signal is used for switching the optically active material between excited and de-excited states. Various arrangements comprising at least one data signal source, at least one container of optically active material, at least one sensing signal source and at least one detector are used to form logic gates and to provide digital optical signal processing.

DETAILED DESCRIPTION OF THE INVENTION

The invention pertains to the use of optically active dyes such as rhodamine, coumarin or other optically active materials to perform processing functions on optical data. The data is carried in pulses of photons of wavelengths appropriate to interact with and excite or de-excite the optically active materials.

The invention utilizes dye cells such as those made using commercially available rhodamine 6G, coumarin, other fluorescent dyes, or other optically active material. A dye cell is pumped using a laser or other suitable pump to raise the dye atoms and or molecules from a low energy state, also called a de-excited state or a ground state, to an excited state. The data pulse, also called data signal, which has a wavelength in the active region of the laser dye, then enters the dye cell. If the data pulse is high in energy, designated as 1 or High, the signal stimulates the excited optical material in the cell and depletes the number of excited species in the cell very rapidly. If the pulse strength is relatively low in energy, designated as 0 or Low, the number of species in the excited state in the optically active medium is not stimulated to de-excite rapidly, but decreases more slowly by spontaneous emission of photons. Accordingly, a High energy signal, designated as a 1, is a signal that is effective in stimulating emission from an optically active material that is in the excited state, and a Low energy signal, designated as a 0, is a signal that is much less effective in stimulating emission from an optically active material.

After the data signal has passed through the optically active medium, the sense pulse of the device, also in the active wavelength range of the dye, is allowed to enter the cell. If the number of species in the excited state is reduced to a de-excited state, due to a prior High level or 1 data pulse, the sense pulse will be absorbed by the optically active medium and will result in a Low level or 0 sense signal detection in the detector. If the number of molecules in the excited state has not been depleted, that is the optically active medium has not been de-excited, because the initial data pulse was at the Low or 0 level, the incoming sense pulse will be amplified in the cell and will emerge with High amplitude, providing a High or 1 level at the detector. This ability to invert the data pulse is utilized in this invention to perform logic functions such as NOT, and NAND.

Figure 1:
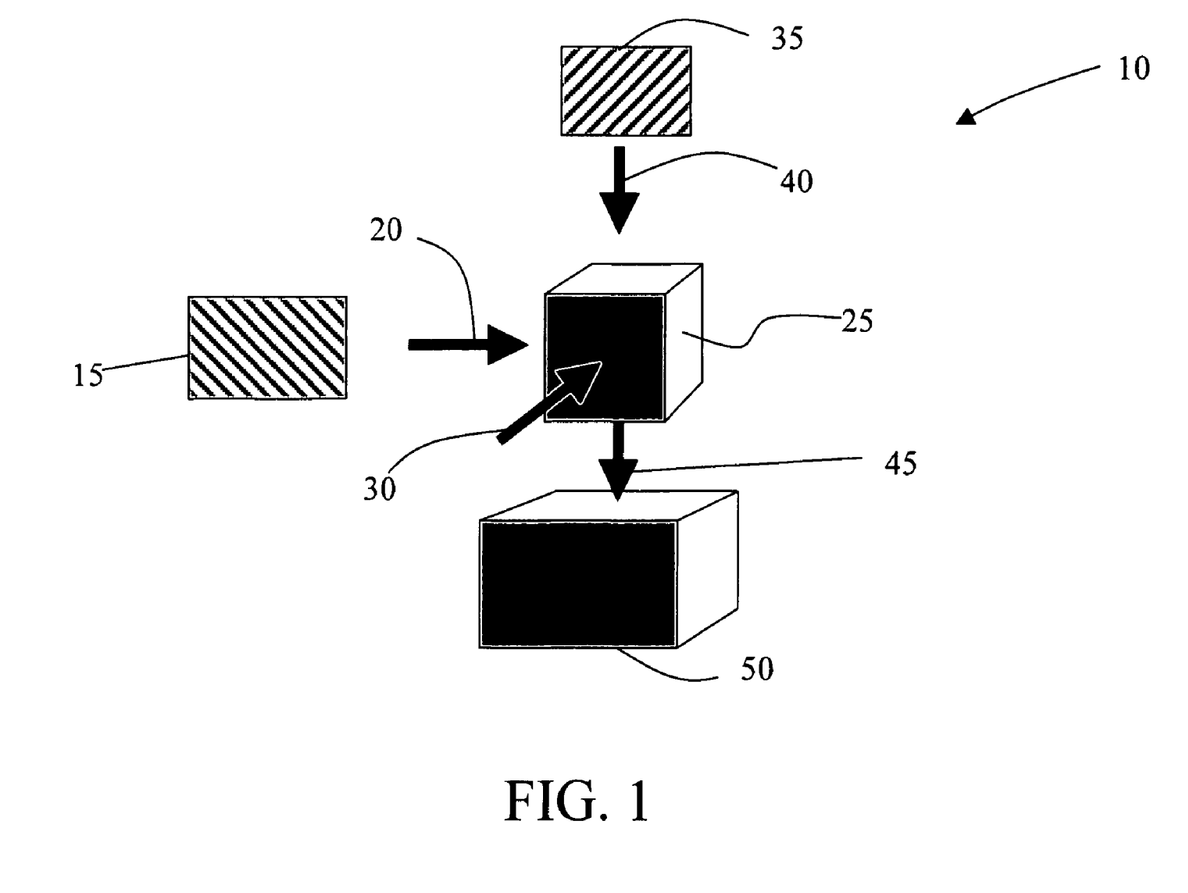
FIG. 1 depicts an inverter device according to one embodiment of the invention.
Figure 2:
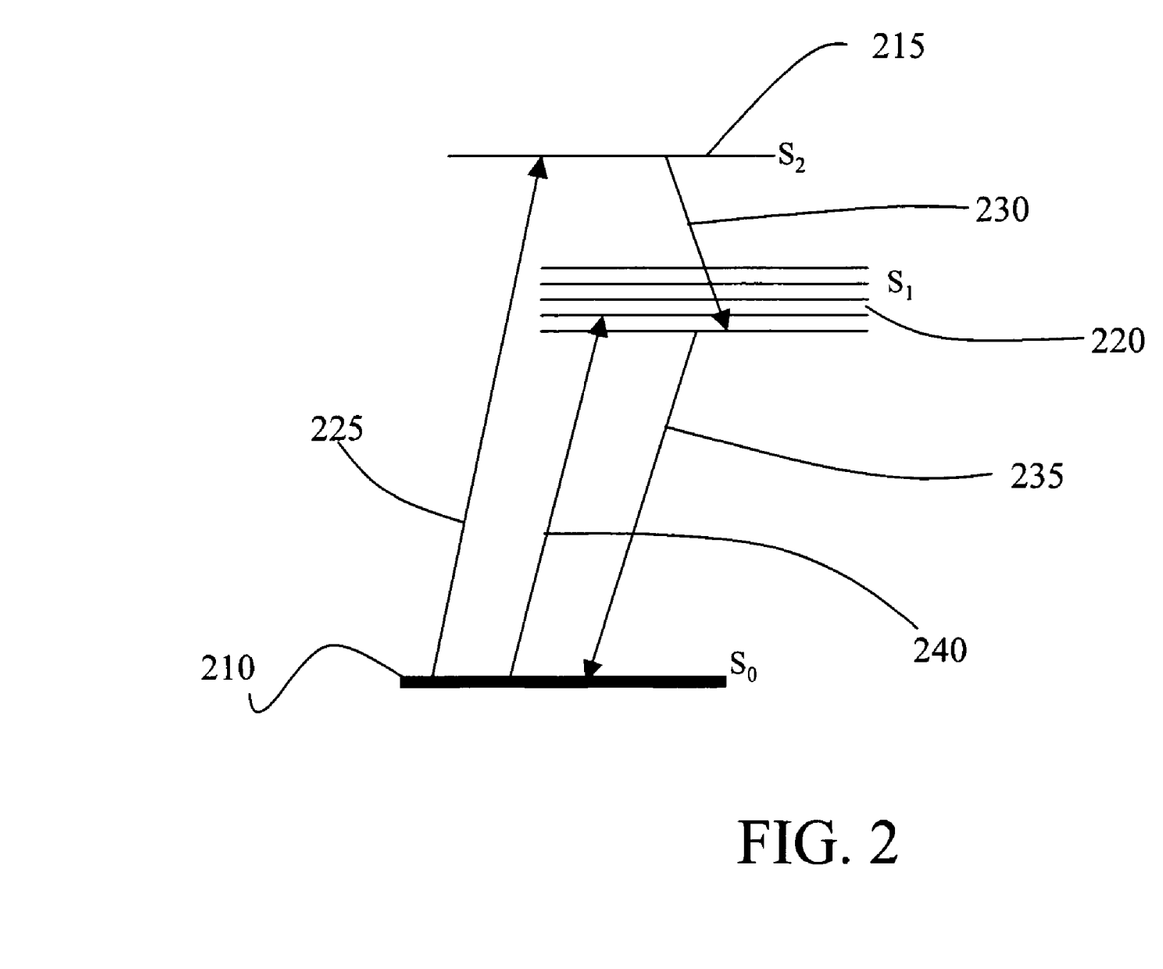
FIG. 2 depicts energy levels of an optically active material.

FIG. 1 shows an inverter 10, which is an optical arrangement, or circuit, providing the NOT function. In the embodiment of the invention shown in FIG. 1, the optically active medium, sometimes called species, is stored in the cell 25 of FIG. 1. The optical medium is first pumped optically by the pulsed pump beam 30. FIG. 2 shows the excited levels of the optically active species used for this particular embodiment of FIG. 1. 210 is the ground energy level of the species, generally understood by those skilled in the art as level $S_0$. The medium is excited and raised to the higher energy levels $S_1$ 220 and $S_2$ 215 by absorbing photons. This absorption is shown as lines 240 and 225 in FIG. 2. Not all de-exciting transitions are necessarily used in the operation of the particular embodiment. For example, in the embodiment shown, the transition from the $S_2$ level 215 to the $S_1$ level 220 is sometimes called a fast transition 230 and does not contribute to the detected output of the cell. The transition from $S_1$ 220 to $S_0$ 210 is the transition shown by 235 and is the transition that is sensed by the detector in this embodiment.

Figure 3A:
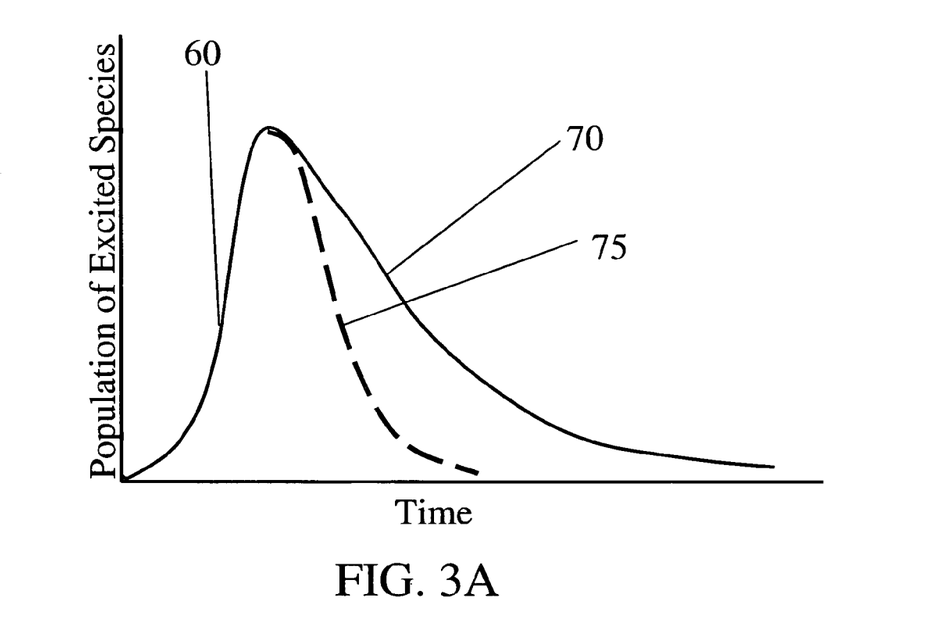
FIG. 3A depicts the difference between stimulated and spontaneous de-excitation.

FIG. 3A shows the effect of stimulated emission on the population of excited. species in the optically active medium. In FIG. 3A the population of excited species in a sample of optically active material is increased by the addition of energy 60. Once excited, the species can stay excited for a long time as shown by 70 wherein the optically active material returns to a low level of excited species through the spontaneous emission of photons without stimulation. Alternatively, the return to a low population of excited species can be substantially speeded, as shown by 75, by the use of a stimulating energy source such as a laser pulse which enhances the de-excitation of the active species in the optically active medium causing the population of excited species to fall quickly.

Referring again to FIG. 1, data signal 20 is emitted by data source 15 after the medium in cell 25 has been optically pumped 30. After the data signal 20 has interacted with the cell 25 the sense emitter 35 sends a signal 40 through the cell 25 and the output 45 from the cell 25 is sensed by the detector 50. The detector 50 can then interface with a read out or other transducer device or it can be an input for further data processing. For example, it could be another cell filled with an optically active medium and function as an input to a logic gate.

Figure 3B:
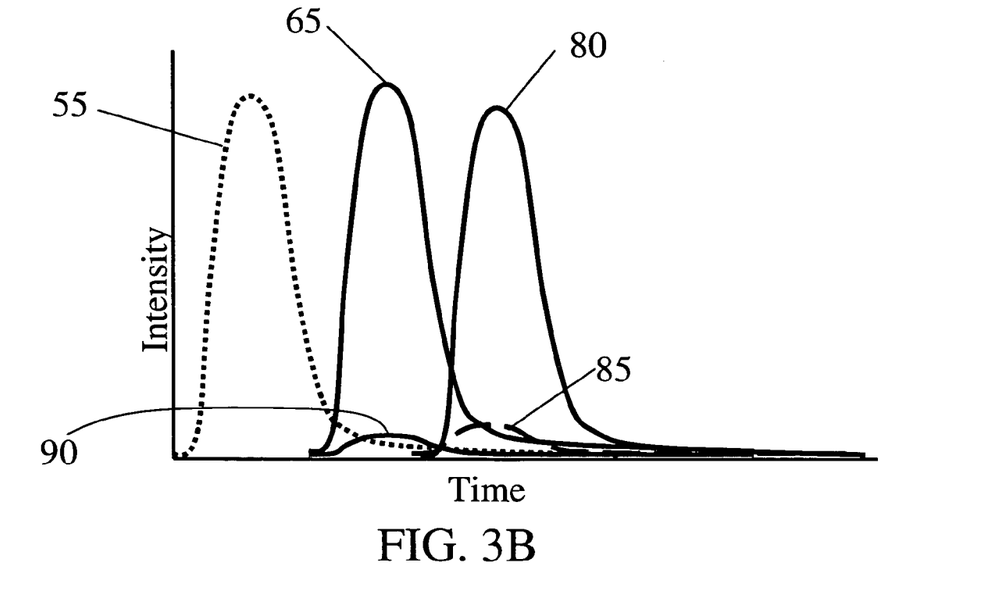
FIG. 3B shows the time distribution of optical pulses as used in the invention.

As shown in FIG. 3B, following the pumping pulse 55, the digital data signal 20 can be a Low 90 or a High 65, determined by its intensity. When the signal is High, that is, the signal has many photons representing a high intensity and a.relatively high energy, the signal is a 1 signal. When the signal is Low, that is, the signal has few photons and consequently low intensity and low energy, the signal is a 0 signal.

The time dependency of these signals is shown in FIG. 3B with the abscissa of FIG. 3B referring to time and the ordinate referring to number of photons or intensity. The time domain pulse of the pumping action 30, usually, but not always, accomplished optically by a laser beam, is shown as trace 55. The pump beam 55 precedes the data signal 20 denoted by traces 65 and 90 in FIG. 3B. Therein a Low intensity pulse 90 is a 0 signal, and a High intensity pulse 65 is a 1 signal. The pump beam 30 increases the number of molecules in the dye cell that are in the excited state 60. When photons of the data signal 20 enter the cell 25, they interact with the species in the excited state, causing emission of additional photons of the same wavelength due to stimulated emission of radiation, sometimes called super-radiant emission. If the data signal is a Low signal 90, a very small number of photons enter the cell 25, causing little increase in stimulated emission, and the number of molecules in the excited state decreases 70 primarily by un-stimulated spontaneous emission of photons. The sense beam 40 from sense emitter 35 can be introduced into the cell from a different direction as shown in FIG. 1. This sense beam 40 is introduced in the cell 25 after the data signal beam 20 intensity is reduced. This is illustrated in FIG. 3B, where the data signal 20, shown as trace 65, is followed by sense signal 40, whose trace is 80. The number of molecules in the excited state when the sense signal reaches the optically active medium has different values depending on the level of the preceding data pulse. If the data pulse 20 preceding the sense pulse 40 had a High level shown by trace 65 in FIG. 3B, the number of molecules in the excited state will have decreased rapidly by photon emission. Since the number of molecules in the excited state is reduced, the sense signal 40 passing through the optically active medium of cell 25 will be absorbed, resulting in a decreased sense pulse 85 reaching the detector 50, as shown in FIG. 3B. On the other hand, if the data signal 20 preceding the sense signal was a Low signal as shown by trace 90, the number of molecules in the excited state will not be affected and will continue to decrease only due to spontaneous emissions from the excited state as shown by trace 70. Since the sense pulse 40 follows in rapid succession to the data pulse 20, the number of molecules in the excited state is sufficiently large to cause an amplification of the sense pulse, resulting in a High level pulse reaching the detector 50. Thus, the detector 50 detects an inverse of the data signal 20, and the embodiment described acts as a digital signal inverter, sometimes called a NOT gate.

Figure 4:
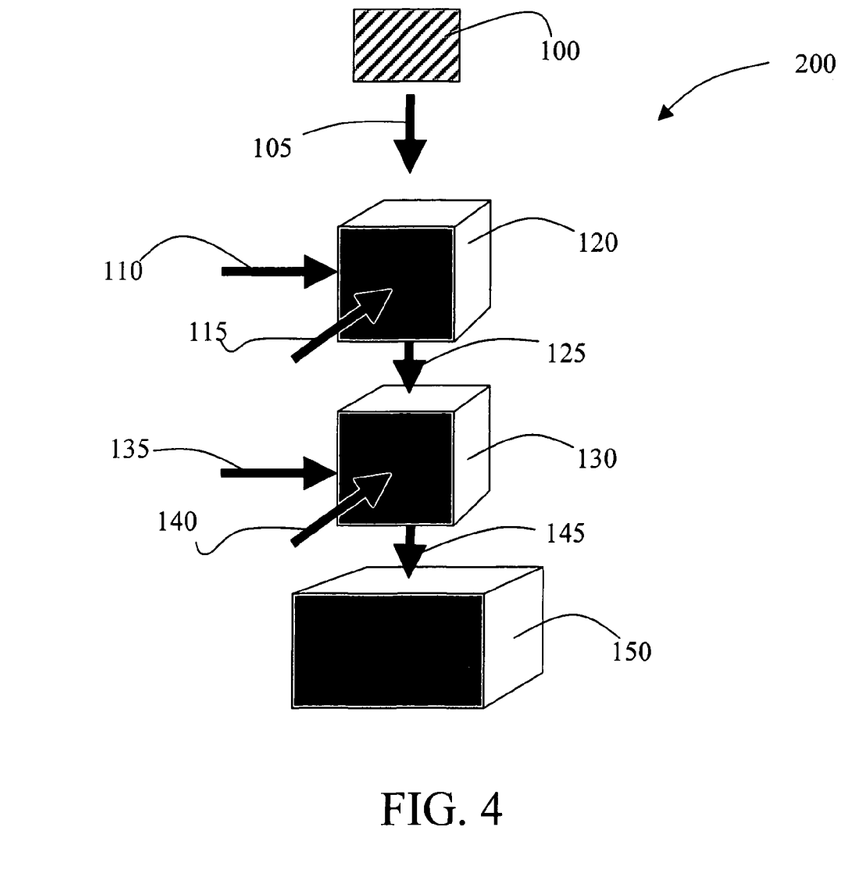
FIG. 4 depicts one embodiment of the invention providing a NAND gate.

Referring to FIG. 4, another embodiment 200 forms an optical NAND gate. This comprises two optically active cells 120 and 130 and a detector cell 150. The optical cells 120 and 130 are pumped by light pulses, shown as beams 115 and 140, from appropriate light sources. Two data signals 110 and 135 enter the two optical cells 120 and 130. The sense pulse 105 is emitted by the source 100 and enters the first cell 120. If the level of the data signal 110 is High, the sense signal 105 will not be amplified in the cell 120. If on the other hand, the data signal 110 is Low, then the cell 120 will amplify the sense signal 105 and transmit it as 125 to the next cell 130. As seen before, if the data signal 135 is at a Low level, the cell 130 will amplify and transmit the sense signal 125 to the detector 150 as 145. If the data signal 135 is a High signal, the cell 130 will not be able to amplify the incoming sense signal 125 or transmit it to the detector due to absorption of the signal by the optical medium. In effect, the sense signal 105 will reach the detector 150 as a High level signal only if both 110 and 135 are at Low levels. If either 110 or 135 is a High signal, the sense signal will be absorbed in the optical cell and will result in a Low level signal reaching the detector 150. The operation described above performs a NAND gate function.

Figure 5:
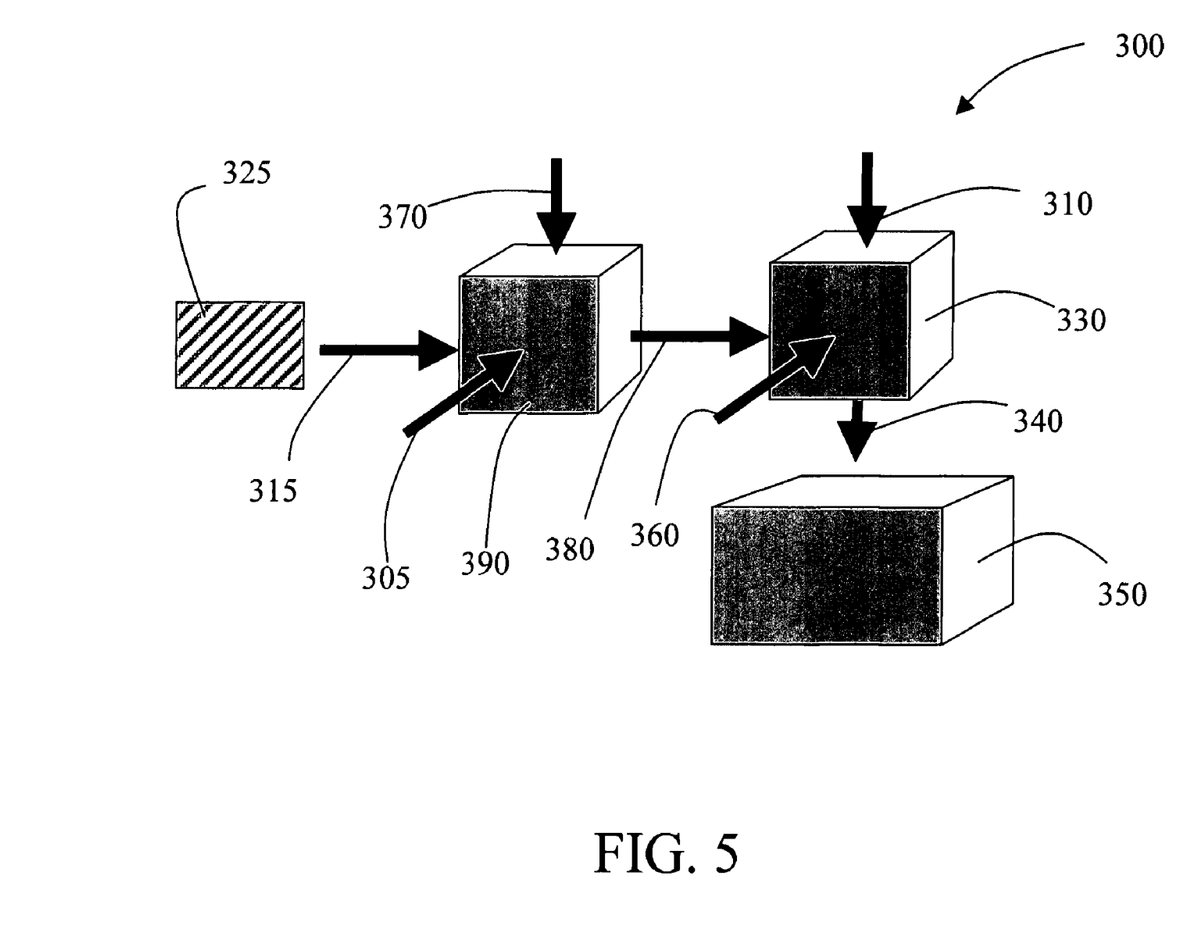
FIG. 5 depicts one embodiment of the invention providing an AND gate.

FIG. 5 shows an embodiment that can be used as an AND gate 300. In this embodiment 325 is the sense signal source and 350 is the final detector; 305 and 360 are the pump beams for their respective cells 390 and 330. 315 is the first sense signal, and is always a 1 in this embodiment. 370 is the first data input, and 310 is, simultaneously, the second data input and the second sense signal, which is functionally equivalent to the sense signal of a single cell. The output 340 only returns a 1 if 370 and 310 are 1. This is an AND gate. When 370 is a 1, 380 is a 0. The second cell 330, with an input of 0 and a sense signal of 1 from 310, inverts the 0 and returns a 1 at the output 340. If 370 were a 0, and 310 a 1, the second cell 330 would invert the 1 from the output 380 of the first cell 390, and the output 340 would be a 0. If 370 were a 1 and 310 were a 0, 340 would automatically be a 0, because a 0 sense signal for the inverter 330 cannot output a 1. Similarly, if both 310 and 370 were 0's, 340 would be a 0 for the same reason.

Figure 6:
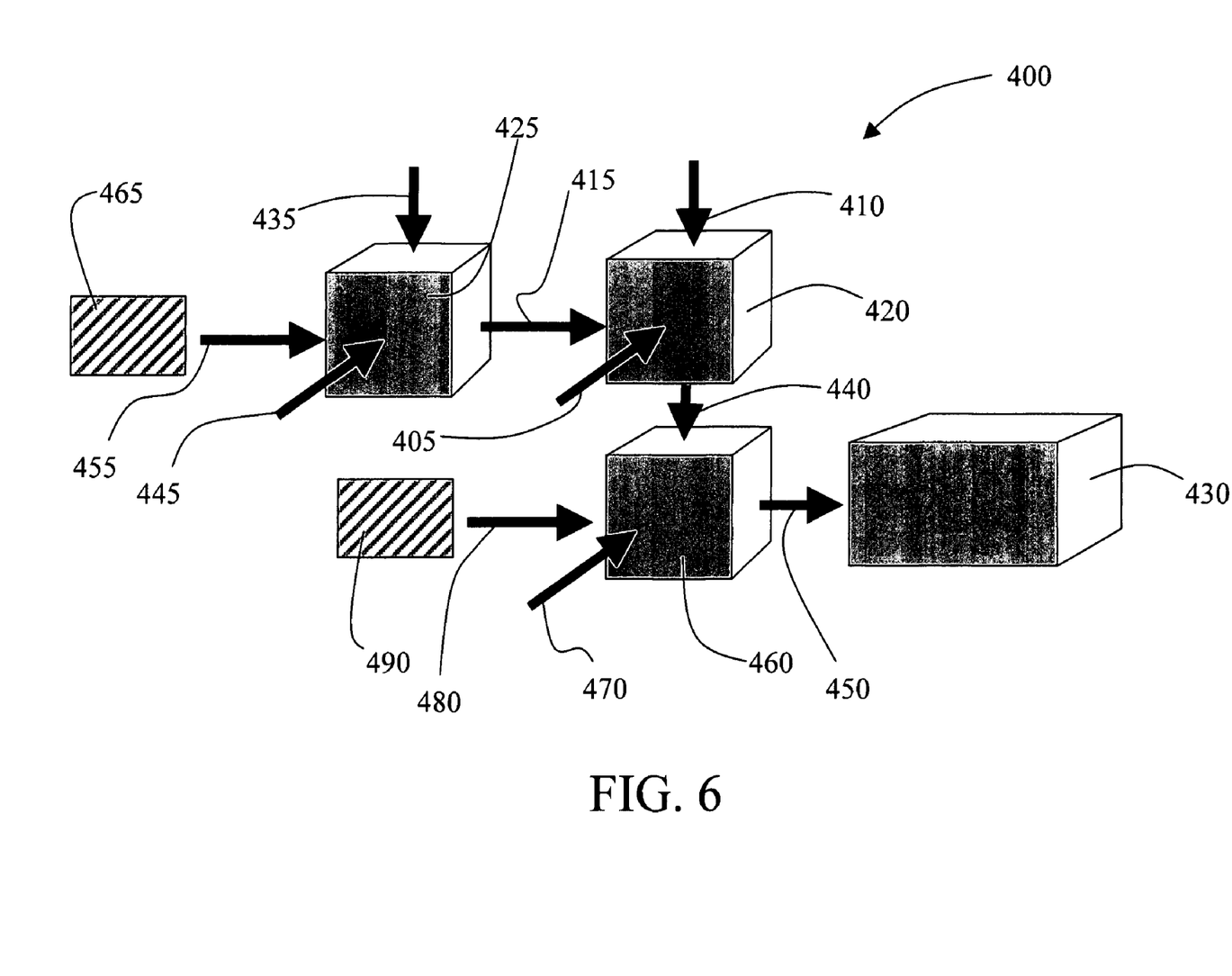
FIG. 6 depicts one embodiment of the invention providing a NOR gate.

In yet another embodiment, as shown in FIG. 6, a NOR gate 400 can be formed by changing the arrangement of cells, sources, and detector. This is the inversion of an AND gate. 465 and 490 are both sense pulse sources, with sense signals 455 and 480 respectively, with values 1. 430 is the final detector. All of the above AND gate outputs are inverted, so that only an input of 1 at both 435 and 410 would result in a 0 at output 450. 435 corresponds to 370 from FIG. 5, 410 corresponds to 310, 455 to 315, 415 to 380, 440 to 340, 445 to 305, 405 to 360, 425 to 390, and 420 to 330. 460 is the third cell, with a pump signal 470.

Figure 7:
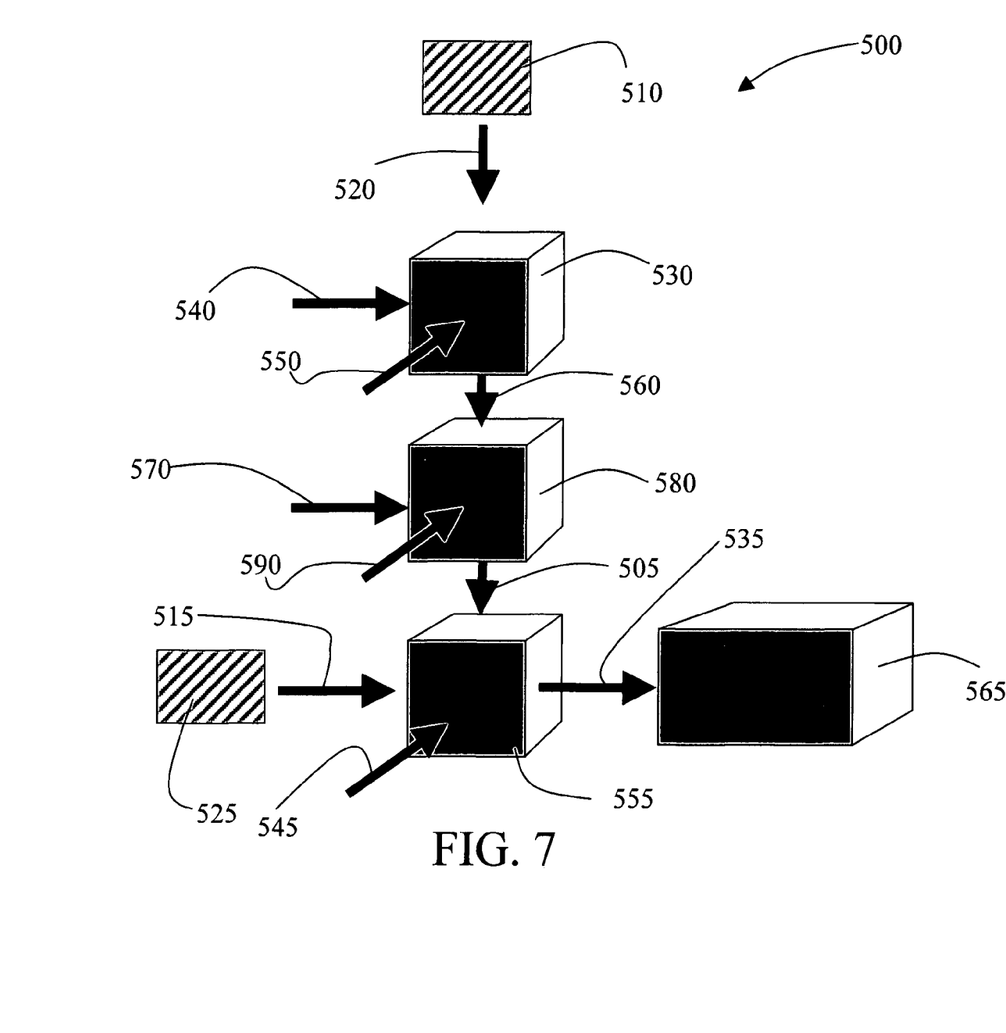
FIG. 7 depicts one embodiment of the invention providing an OR gate.

In another embodiment an OR gate can be formed using an arrangement as shown in FIG. 7. This is the inversion of a NAND gate. 510 and 525 are sense pulse sources, with sense signals 520 and 515 respectively, outputting 1. 565 is the final detector. 530 and 580 correspond to 120 and 130 in FIG. 4, 550 to 115, 590 to 140, 540 to 110, 570 to 135, 560 to 125, and 505 to 145. 545 is the pump signal for the third cell 555. This cell inverts the input 505 (which depends on inputs 540 and 570, with NAND logic). Therefore, 505 is a 1 only when both 540 and 570 are 0, so the output 535 is a 0. When 540 is a 0 and 570 is a 1, 540 is a 1 and 570 is a 0, or when both 540 and 570 are 1, 505 is a 0, and 535 is a 1.

In each of the above embodiments alternative embodiments can be made by combining the separate sense pulse sources into one sense pulse source and utilizing beam splitters and mirrors to obtain the required number of beams. The same strategy can also be applied to the pump signals to reduce the number of individual sources that are necessary.

From another aspect using arrangements of just NOT gates and NAND gates can provide equivalent functionality to all the common electronic logic gates such as the AND, OR, NOR, and XOR gates. These arrangements can be configured in various ways and are well known by those skilled in the art.

In another embodiment the functionality required by nearly any truth table can be provided by those skilled in the art when properly arranging the set of logic gates to satisfy the requirements of that truth table.

Utilizing the invention, other types of logic gates can be fabricated. As discussed above, demonstrations of a NOT function and of a NAND function provide a wide ranging capability from a digital processing perspective. The fundamental arrangements of optical logic devices can be similar to those used in electronic circuits and computers. Using configurations of the logic gates discussed above, an optical circuit can be formed that provides nearly any desired set of digital process results satisfying nearly any truth table. Such configurations are commonly discussed in text books on digital processing techniques.

From yet another aspect, the invention can be used to process digital information coming from any digital source that is or can be converted to an optical data stream. The ability to digitally process such data streams from an optical perspective can dramatically increase the speed of systems. This is especially true in communications and, especially, in telephonic communications.

This invention has been explained with respect to the details, arrangements of components and certain specific embodiments shown in the accompanying drawings. Those skilled in the art can design larger and more complex optical devices that can perform more complex tasks without deviating from the spirit and scope of this invention. The appended claims are intended to be interpreted to cover apparatuses and methods that do not depart from the spirit and scope of this invention.

What is claimed is:

1. An apparatus for manipulating digital optical data comprising:
    an optically active dye that can be optically switched between two states;
    an optical pumping energy source for exciting the optically active dye;
    an optical data signal source capable of changing the state of the optically active dye;
    an optical sense signal source for providing a sense signal to the optically active dye for determining the state of the optically active dye; and
    a detector for detecting the state of the optically active dye from the sense signal.

2. The apparatus of claim 1 wherein the optically active dye is placed in more than one optically transparent cell with the cells arranged to provide specific logic functions.

3. The apparatus of claim 1 wherein the apparatus is configured to form a logic gate.

4. The apparatus of claim 3 wherein logic gates are configured to provide a desired data processing function.

5. The apparatus of claim 3 wherein the logic gate is a NOT gate.

6. The apparatus of claim 3 wherein the logic gate is a NAND gate.

7. The apparatus of claim 1 wherein the apparatus is used to perform data processing in a computer.

8. The apparatus of claim 1 wherein the apparatus is used for processing optical data in applications not involving logic functions.

9. The apparatus of claim 1 wherein the apparatus is used for processing communication data.

10. The apparatus of claim 1 wherein the apparatus is used for processing telephonic communication data.

11. The apparatus of claim 1 wherein the data signal source is used to optically pump the optically active dye for achieving an initially excited state in the optically active dye.

12. The apparatus of claim 1 wherein the sense signal source is used to optically pump the optically active dye for achieving an initially excited state in the optically active dye.

13. An apparatus for optical logic gate data processing comprising:
    an optically active dye capable of existing in an excited state and a de-excited state for switching between the states;
    an optical pumping energy signal source for exciting the optically active dye to an excited state;
    at least one optical data signal source capable of changing the state of the optically active dye;
    an optical sense signal source for providing a sense signal to the optically active dye for determining the state of the optically active dye; and
    at least one detector for detecting the state of the optically active dye from the sense signal.

14. The apparatus of claim 13 wherein the apparatus is configured to form a logic gate.

15. The apparatus of claim 14 wherein a plurality of logic gates are configured to provide a desired data processing function.

16. The apparatus of claim 13 wherein the functions of at least two of the signal producing elements are combined.

17. The apparatus of claim 13 wherein the apparatus is used for processing any digital optical data.

18. The apparatus of claim 1 further comprising an optically transparent cell for containing the optically active dye.

* * * * *